(12) United States Patent
Kim

(10) Patent No.: US 12,077,191 B2
(45) Date of Patent: Sep. 3, 2024

(54) METHOD OF CONTROLLING OPERATION OF FOLDABLE PEDAL DEVICE

(71) Applicants: Hyundai Motor Company, Seoul (KR); Kia Corporation, Seoul (KR)

(72) Inventor: Eun Sik Kim, Gwangmyeong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 289 days.

(21) Appl. No.: 17/670,206

(22) Filed: Feb. 11, 2022

(65) Prior Publication Data

US 2022/0379915 A1 Dec. 1, 2022

(30) Foreign Application Priority Data

May 31, 2021 (KR) .................. 10-2021-0070371

(51) Int. Cl.
*B60W 60/00* (2020.01)
*B60K 26/02* (2006.01)
*B60T 7/06* (2006.01)
*G05G 1/30* (2008.04)
*G05G 1/40* (2008.04)

(52) U.S. Cl.
CPC .......... *B60W 60/005* (2020.02); *B60K 26/02* (2013.01); *B60T 7/06* (2013.01); *G05G 1/305* (2013.01); *G05G 1/40* (2013.01); *B60K 2026/026* (2013.01)

(58) Field of Classification Search
CPC .............. B60W 60/005; B60W 10/08; B60W 30/18127; B60W 60/001; B60W 2540/10; B60W 2540/12; B60K 26/02; B60K 2026/026; B60T 7/06; B60T 7/042; G05G 1/305; G05G 1/40; G05G 1/44; G05G 1/30; G05D 1/0061; B60Y 2300/18125
See application file for complete search history.

(56) References Cited

U.S. PATENT DOCUMENTS

| 6,182,525 | B1* | 2/2001 | Bowers .................. B60K 23/02 180/274 |
| 6,318,208 | B1* | 11/2001 | Thongs, Jr. .............. G05G 1/38 74/513 |
| 10,889,226 | B1* | 1/2021 | Dean ........................ B60T 7/06 |
| 11,285,988 | B1* | 3/2022 | Hitzinger ............. G05D 1/0061 |
| 2015/0253804 | A1* | 9/2015 | Baur ........................ G05G 1/40 180/315 |
| 2017/0320501 | A1* | 11/2017 | Li .......................... B60K 35/00 |

(Continued)

FOREIGN PATENT DOCUMENTS

| KR | 10-2017-0137427 | 12/2017 |
| KR | 10-2022-0060242 | 5/2022 |
| KR | 10-2022-0064791 | 5/2022 |

*Primary Examiner* — Abdalla A Khaled
(74) *Attorney, Agent, or Firm* — MORGAN, LEWIS & BOCKIUS LLP

(57) ABSTRACT

A method of controlling a foldable pedal device includes an operation of the foldable pedal device, in which both a foldable accelerator pedal and a foldable brake pedal are hidden in an autonomous driving mode, both the foldable accelerator pedal and the foldable brake pedal basically pop up in a manual driving mode, and a one-pedal mode may be implemented such that only one of the foldable accelerator pedal and the foldable brake pedal pops up in the manual driving mode according to a driver's selection.

20 Claims, 5 Drawing Sheets

(56) References Cited

U.S. PATENT DOCUMENTS

| | | | | |
|---|---|---|---|---|
| 2018/0029501 A1* | 2/2018 | Wolf | ............ | B62D 1/181 |
| 2018/0093675 A1* | 4/2018 | Holub | ............ | B60W 60/0059 |
| 2019/0310678 A1* | 10/2019 | Wojciechowski | ... | B60K 26/021 |
| 2020/0317152 A1* | 10/2020 | Ghaffari | ............ | F16H 19/001 |
| 2020/0317166 A1* | 10/2020 | Ghaffari | ............ | B60K 26/02 |
| 2022/0001843 A1* | 1/2022 | Michael | ............ | B60T 7/042 |
| 2022/0144224 A1* | 5/2022 | Tarandek | ............ | G05G 5/03 |
| 2023/0202297 A1* | 6/2023 | Kinouchi | ............ | B60K 26/02 |
| | | | | 74/560 |

* cited by examiner

METHOD OF CONTROLLING OPERATION OF FOLDABLE PEDAL DEVICE

CROSS REFERENCE TO RELATED APPLICATION

The present application claims priority to Korean Patent Application No. 10-2021-0070371, filed May 31, 2021, the entire contents of which is incorporated herein for all purposes by this reference.

BACKGROUND OF THE INVENTION

Field of the Invention

The present invention relates to a method of controlling an operation of a foldable pedal device, and more particularly, to a method of controlling an operation of a foldable pedal device, which is capable of implementing a one-pedal mode by allowing any one of a foldable accelerator pedal and a foldable brake pedal to pop up according to a driver's selection during manual driving.

Description of Related Art

An autonomous vehicle refers to a smart vehicle to which an autonomous driving technology is applied so that the vehicle autonomously arrives at a destination even though a driver does not directly manipulate a steering wheel, an accelerator pedal, and a brake pedal. Recently, the autonomous vehicle is actively developed.

In a case in which an autonomous driving situation is universally implemented, the driver may select a manual driving mode in which the driver directly drives the vehicle and an autonomous driving mode in which the driver does not directly drive the vehicle and the vehicle autonomously travels to the destination.

It is necessary to enable the driver to take a rest comfortably with his feet stretched in the autonomous driving mode. If pedals (an accelerator pedal and a brake pedal) positioned in a lower space of a driver seat are kept exposed to the interior of the vehicle in the autonomous driving mode, the pedals disturb the driver's relaxation. In particular, if a pad of a pedal device is erroneously manipulated regardless of the driver's intention, there is a high concern that autonomous driving is forcibly stopped, which may cause an accident.

Therefore, a foldable pedal device for an autonomous vehicle is actively developed, in which the pad of the pedal device is exposed to protrude toward the driver so that the driver may manipulate the pad in the manual driving mode in which the driver directly drives the vehicle, and the pad of the pedal device is hidden so as not to protrude toward the driver in the autonomous driving mode so that the pad cannot be manipulated by the driver, thereby ensuring the driver's comfortable relaxation and implementing safety by preventing an erroneous manipulation.

A state in which the foldable pedal device is exposed to protrude toward the driver to allow the driver's manual driving is referred to as a pop-up state, and a state in which the foldable pedal device is hidden so as not to protrude toward the driver in the autonomous driving situation is referred to as a hide state.

The foldable pedal device provided in the autonomous vehicle typically includes a foldable accelerator pedal and a foldable brake pedal, and the foldable accelerator pedal and the foldable brake pedal are configured to pop up or hide simultaneously. For this reason, the driver is inconvenienced when the driver implements a one-pedal mode in which the driver manipulates the single pedal to perform accelerating and braking operations.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method of controlling an operation of a foldable pedal device, in which both a foldable accelerator pedal and a foldable brake pedal are hidden in an autonomous driving mode, both the foldable accelerator pedal and the foldable brake pedal basically pop up in a manual driving mode, and a one-pedal mode may be implemented such that only one of the foldable accelerator pedal and the foldable brake pedal pops up in the manual driving mode according to a driver's selection, thereby improving driver's convenience and marketability.

In order to achieve the above-mentioned object, various aspects of the present invention are directed to providing a method of controlling an operation of a foldable pedal device, the method including: a signal generation determining step of determining whether a one-pedal mode signal has been generated in an autonomous driving mode or a manual driving mode; a signal type determining step of determining whether the one-pedal mode signal is a foldable accelerator pedal signal or a foldable brake pedal signal when in the signal generation determining step, it is determined that the one-pedal mode signal has been generated; and a one-accelerator-pedal step of allowing a foldable accelerator pedal to be switched to a pop-up state or kept in the pop-up state and allowing a foldable brake pedal to be switched to a hide state or kept in the hide state when in the signal type determining step, it is determined that the one-pedal mode signal is the foldable accelerator pedal signal.

The autonomous driving mode and the manual driving mode may be performed under control of an autonomous driving controller that is connected to an autonomous driving mode switch and a signal of a manual driving mode switch and configured to receive a signal of the autonomous driving mode switch and a signal of the manual driving mode switch, in which the autonomous driving controller may transmit the signal of the autonomous driving mode switch and the signal of the manual driving mode switch to a foldable pedal controller, and in which the foldable accelerator pedal and the foldable brake pedal may be controlled in operation by the foldable pedal controller to pop up or hide.

When the autonomous driving mode switch generates a signal, both the foldable accelerator pedal and the foldable brake pedal may be controlled in operation to be in the hide state.

When the manual driving mode switch generates a signal, both the foldable accelerator pedal and the foldable brake pedal may be controlled in operation to be in the pop-up state.

When a one-pedal mode switch is manipulated, the one-pedal mode signal may be generated and transmitted to an autonomous driving controller, the autonomous driving controller may transmit the one-pedal mode signal to a foldable pedal controller, and the foldable accelerator pedal and the foldable brake pedal may be controlled in operation by the foldable pedal controller to pop up or hide.

The one-pedal mode switch may include a one-accelerator-pedal mode switch and a one-brake-pedal mode switch which are separated from each other and operate individually to generate signals thereof.

The one-pedal mode switch may be configured as a single switch, such that the one-pedal mode switch may be manipulated once to generate any one of the foldable accelerator pedal signal and the foldable brake pedal signal, and the one-pedal mode switch may be manipulated twice continuously to generate the other of the foldable accelerator pedal signal and the foldable brake pedal signal.

Regenerative braking of a vehicle may go to a maximum level when the one-accelerator-pedal step is performed, in which when the popped-up foldable accelerator pedal is manipulated, an acceleration signal may be generated, such that the vehicle accelerates, and in which the regenerative braking may be generated when the manipulated foldable accelerator pedal returns to a predetermined position.

When the foldable accelerator pedal signal determined in the signal type determining step is transmitted to an autonomous driving controller, the autonomous driving controller may transmit a control signal to a vehicle controller, the vehicle controller may transmit a control signal to a drive motor controller, and a drive motor of a vehicle may operate under control of the drive motor controller, such that the vehicle may accelerate when the foldable accelerator pedal is manipulated.

The method may further include a one-brake-pedal step of allowing the foldable brake pedal to be switched to the pop-up state or kept in the pop-up state and allowing the foldable accelerator pedal to be switched to the hide state or kept in the hide state when in the signal type determining step, it is determined that the one-pedal mode signal is the foldable brake pedal signal.

When the one-brake-pedal step is performed, regenerative braking of a vehicle may go to a maximum level, in which when the popped-up foldable brake pedal is manipulated, an acceleration signal may be generated, such that the vehicle accelerates, and in which the regenerative braking may be generated when the manipulated foldable brake pedal returns to a predetermined position.

When the foldable brake pedal signal determined in the signal type determining step is transmitted to an autonomous driving controller, the autonomous driving controller may transmit a control signal to a vehicle controller, the control signal, which has been transmitted to a braking controller electrically connected to the vehicle controller, from the vehicle controller, may be changed to be transmitted to a drive motor controller, and a drive motor of a vehicle may operates under control of the drive motor controller, such that the vehicle may accelerate when the foldable brake pedal is manipulated.

Furthermore, a method of controlling an operation of a foldable pedal device according to various exemplary embodiments of the present invention may include a signal generation determining step of determining whether a one-pedal mode signal has been generated in an autonomous driving mode or a manual driving mode; and a one-accelerator-pedal step of allowing a foldable accelerator pedal to be switched to a pop-up state or kept in the pop-up state and allowing a foldable brake pedal to be switched to a hide state or kept in the hide state when in the signal generation determining step, it is determined that the one-pedal mode signal has been generated.

The autonomous driving mode and the manual driving mode may be performed under control of an autonomous driving controller that is connected to an autonomous driving mode switch and a signal of a manual driving mode switch and configured to receive a signal of the autonomous driving mode switch and a signal of the manual driving mode switch, in which the autonomous driving controller may transmit the signal of the autonomous driving mode switch and the signal of the manual driving mode switch to a foldable pedal controller, and in which the foldable accelerator pedal and the foldable brake pedal may be controlled in operation by the foldable pedal controller to pop up or hide.

When the autonomous driving mode switch generates a signal, both the foldable accelerator pedal and the foldable brake pedal may be controlled in operation to be in the hide state.

When the manual driving mode switch generates a signal, both the foldable accelerator pedal and the foldable brake pedal may be controlled in operation to be in the pop-up state.

When a one-pedal mode switch is manipulated, the one-pedal mode signal may be generated and transmitted to an autonomous driving controller, the autonomous driving controller may transmit the one-pedal mode signal to a foldable pedal controller, and the foldable accelerator pedal and the foldable brake pedal may be controlled in operation by the foldable pedal controller to pop up or hide.

Regenerative braking of a vehicle may go to a maximum level when the one-accelerator-pedal step is performed, in which when the popped-up foldable accelerator pedal is manipulated, an acceleration signal may be generated, such that the vehicle accelerates, and in which the regenerative braking may be generated when the manipulated foldable accelerator pedal returns to a predetermined position.

When a signal of the one-pedal mode switch is transmitted to the autonomous driving controller, the autonomous driving controller may transmit a control signal to a vehicle controller, the vehicle controller may transmit a control signal to a drive motor controller, and a drive motor of a vehicle may operate under control of the drive motor controller, such that the vehicle may accelerate when the foldable accelerator pedal is manipulated.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
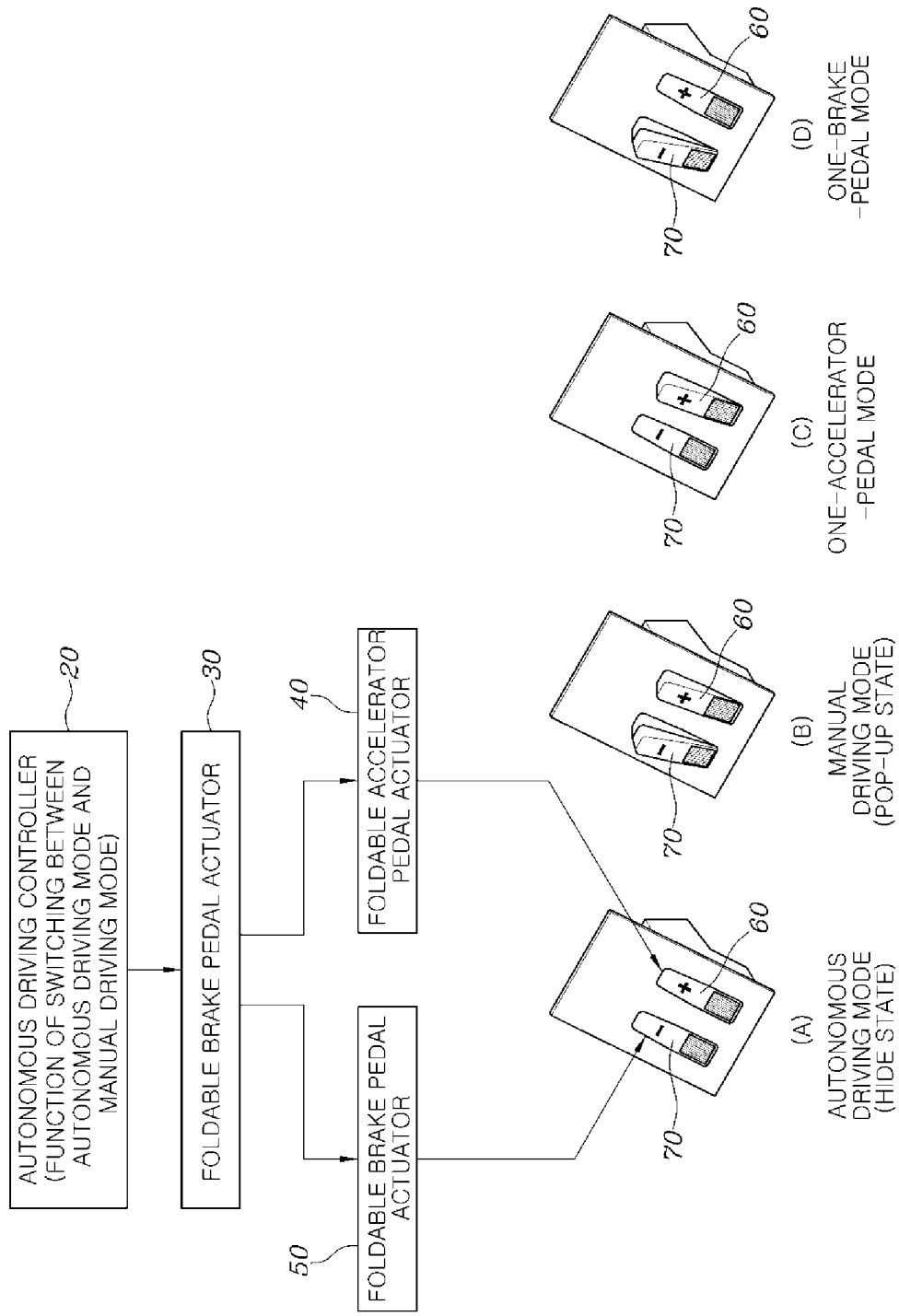
FIG. 1, FIG. 2, and FIG. 3 are a schematic configuration view, a block diagram, and a flowchart for explaining a method of controlling an operation of a foldable pedal device according to various exemplary embodiments of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Specific structural or functional descriptions of embodiments of the present invention disclosed in the exemplary embodiment or application are exemplified only for the purpose of explaining the embodiments according to various exemplary embodiments of the present invention, the embodiments according to various exemplary embodiments of the present invention may be carried out in various forms, and it should not be interpreted that the present invention is limited to the embodiments described in the exemplary embodiment or application.

Because the embodiments according to various exemplary embodiments of the present invention may be variously changed and may have various forms, specific embodiments will be illustrated in the drawings and described in detail in the exemplary embodiment or application. However, the descriptions of the specific embodiments are not intended to limit embodiments according to the concept of the present invention to the specific embodiments, but it should be understood that the present invention covers all modifications, equivalents and alternatives falling within the spirit and technical scope of the present invention.

The terms such as "first" and/or "second" may be used to describe various constituent elements, but these constituent elements should not be limited by these terms. These terms are used only for the purpose of distinguishing one constituent element from other constituent elements. For example, without departing from the scope according to the concept of the present invention, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

The terms used in the exemplary embodiment are used only for the purpose of describing various exemplary embodiments and are not intended to limit the present invention. Singular expressions include plural expressions unless clearly described as different meanings in the context. In the exemplary embodiment, it should be understood the terms "comprises," "comprising," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which various exemplary embodiments of the present invention pertains. The terms such as those defined in a commonly used dictionary should be interpreted as having meanings consistent with meanings in the context of related technologies and should not be interpreted as ideal or excessively formal meanings unless explicitly defined in the exemplary embodiment of the present invention.

A control unit (controller) according to various exemplary embodiments of the present invention may be implemented by a non-volatile memory configured to algorithm for controlling operations of various constituent elements in a vehicle or store data related to software commands for executing the algorithm, and by a processor configured to perform the following operations by using the data stored in the corresponding memory. In the present case, the memory and the processor may be implemented as separate chips. Alternatively, the memory and the processor may be implemented as a single chip in which the memory and the processor are integrated. The processor may be configured in the form of one or more processors.

Hereinafter, a method of controlling an operation of a foldable pedal device according to various exemplary embodiments of the present invention will be described with reference to the accompanying drawings.

An autonomous vehicle may select a manual driving mode in which the driver directly drives the vehicle and an autonomous driving mode in which the driver does not directly drive the vehicle and the vehicle autonomously travels to the destination.

Figure 2:
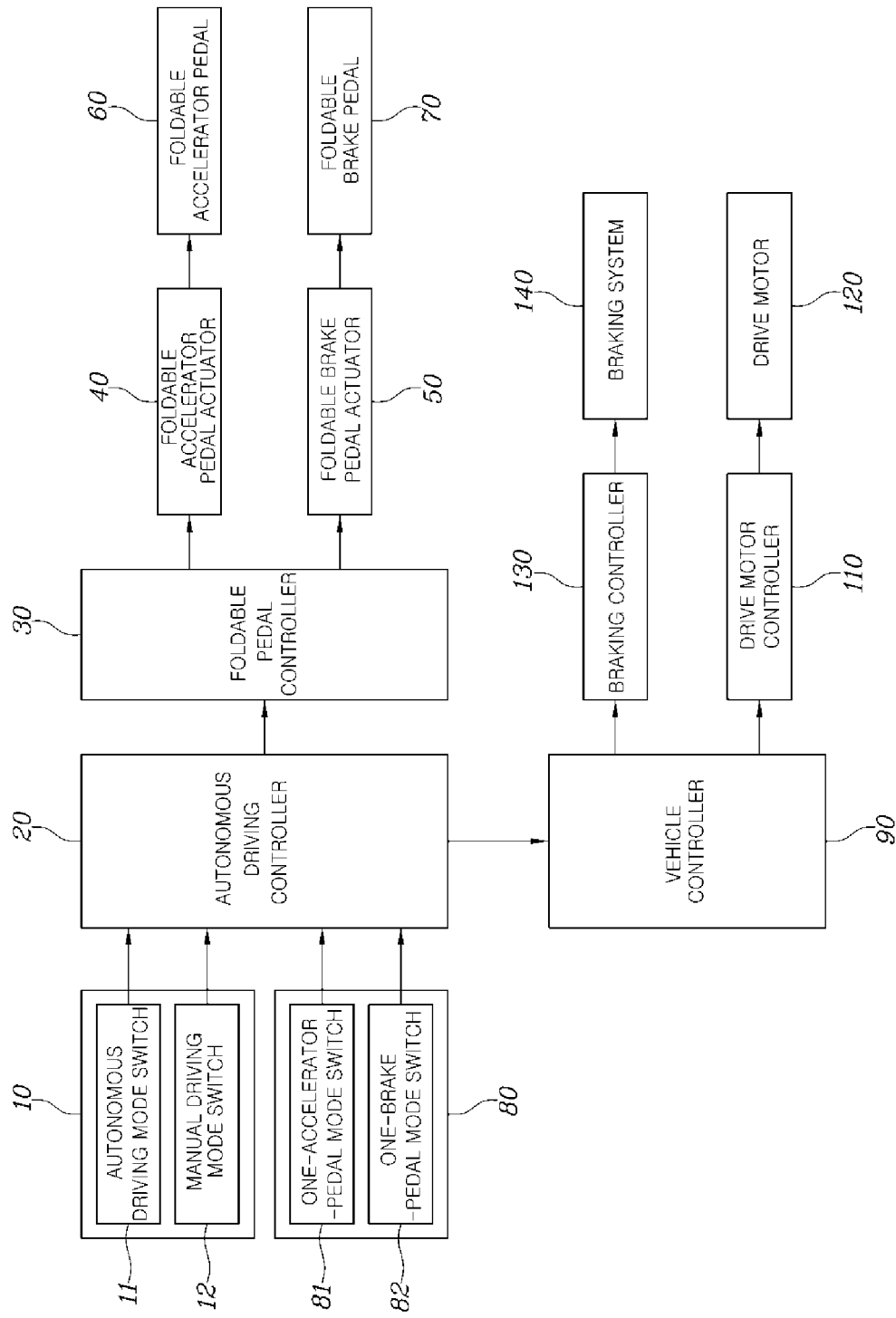

As illustrated in FIGS. 1 to 2, the driver may select the autonomous driving mode and the manual driving mode of the vehicle by manipulating a driving mode switch 10.

The driving mode switch 10 may include an autonomous driving mode switch 11 and a manual driving mode switch 12 that the driver may manipulate.

As another example, the driving mode switch 10 may be configured as a single switch in such a way that the autonomous driving mode is performed when the driver manipulates the driving mode switch 10 once, and the manual driving mode is performed when the driver manipulates the driving mode switch 10 once again.

The driving mode switch 10 may be installed at the periphery of a driver seat to allow the driver to easily manipulate the driving mode switch 10. In the autonomous vehicle, the driving mode switch 10 may be positioned on a driver seat, as necessary.

When the driver manipulates the autonomous driving mode switch 11 or the manual driving mode switch 12, an operating signal is transmitted to an autonomous driving controller 20. The autonomous driving controller 20 transmits a control signal to a foldable pedal controller 30, and a foldable accelerator pedal actuator 40 and a foldable brake pedal actuator 50 are operated under control of the foldable pedal controller 30.

When the foldable accelerator pedal actuator 40 operates, a foldable accelerator pedal 60 pops up or hides. When the foldable brake pedal actuator 50 operates, a foldable brake pedal 70 pops up or hides.

Basically, when an autonomous driving mode signal is generated as the driver manipulates the autonomous driving mode switch 11, both the foldable accelerator pedal 60 and the foldable brake pedal 70 are controlled in operation by the autonomous driving controller 20 to be in a hide state (state A in FIG. 1).

Furthermore, when a manual driving mode signal is generated as the driver manipulates the manual driving mode switch 12, both the foldable accelerator pedal 60 and the foldable brake pedal 70 are controlled in operation by the autonomous driving controller 20 to be in a pop-up state (state B in FIG. 1).

The foldable accelerator pedal 60 and the foldable brake pedal 70 are installed and positioned in a lower space of the driver seat so that the driver manipulates the foldable accelerator pedal 60 and the foldable brake pedal 70 with his/her foot.

In order to ensure the driver's comfortable relaxation and implement safety by preventing an erroneous manipulation in the autonomous driving mode, the foldable accelerator pedal 60 and the foldable brake pedal 70 needs to be in the hide state in which the foldable accelerator pedal 60 and the foldable brake pedal 70 are not exposed to the driver. Therefore, the pedal device needs to be hidden so as not to protrude toward the driver.

Furthermore, in the manual driving mode in which the driver drives the vehicle, the driver manipulates the foldable accelerator pedal 60 and the foldable brake pedal 70 with his/her foot. To the present end, the foldable accelerator pedal 60 and the foldable brake pedal 70 need to pop up to be exposed to the driver.

In the exemplary embodiment of the present invention, a one-pedal mode may be implemented in the manual driving mode by allowing only one of the foldable accelerator pedal 60 and the foldable brake pedal 70 to pop up according to the driver's selection.

A one-pedal mode switch 80 is provided to implement the one-pedal mode. The one-pedal mode switch 80 may include a one-accelerator-pedal mode switch 81 and a one-brake-pedal mode switch 82, which are separated from each other. Alternatively, the one-pedal mode switch 80 may be configured as a single switch.

In the case in which the one-pedal mode switch 80 includes the one-accelerator-pedal mode switch 81 and the one-brake-pedal mode switch 82, which are separated from each other, the one-accelerator-pedal mode switch 81 and the one-brake-pedal mode switch 82 operate and generate signals individually.

Furthermore, in the case in which the one-pedal mode switch 80 is configured as a single switch, any one of a foldable accelerator pedal signal and a foldable brake pedal signal may be generated when the driver manipulates the one-pedal mode switch 80 once, and the other of the foldable accelerator pedal signal and the foldable brake pedal signal may be generated when the driver manipulates the one-pedal mode switch 80 continuously twice.

For example, the foldable accelerator pedal signal may be generated when the one-pedal mode switch 80 configured as a single switch is manipulated an odd number of times, and the foldable brake pedal signal may be generated when the one-pedal mode switch 80 is manipulated continuously an even number of times.

In the exemplary embodiment of the present invention, the configuration in which the one-pedal mode switch 80 includes the one-accelerator-pedal mode switch 81 and the one-brake-pedal mode switch 82, which are separated from each other, will be basically described.

The one-pedal mode switch 80 may be installed at the periphery of the driver seat to allow the driver to easily manipulate the one-pedal mode switch 80. In the autonomous vehicle, the one-pedal mode switch 80 may be positioned on the driver seat, as necessary.

When the driver manipulates the one-accelerator-pedal mode switch 81 or the one-brake-pedal mode switch 82, an operating signal is transmitted to the autonomous driving controller 20. The autonomous driving controller 20 transmits a one-pedal mode signal to the foldable pedal controller 30, and the foldable accelerator pedal actuator 40 and the foldable brake pedal actuator 50 operate under control of the foldable pedal controller 30.

When the foldable accelerator pedal actuator 40 operates, the foldable accelerator pedal 60 pops up or hides. When the foldable brake pedal actuator 50 operates, the foldable brake pedal 70 pops up or hides.

First, when the one-accelerator-pedal mode switch 81 of the one-pedal mode switch 80 generates a signal, the foldable accelerator pedal 60 is switched to the pop-up state or kept in the pop-up state and the foldable brake pedal 70 is switched to the hide state or kept in the hide state under control of the autonomous driving controller 20 (state C in FIG. 1).

In the present case, the situation in which the foldable accelerator pedal 60 is switched to the pop-up state is a situation in which the one-accelerator-pedal mode is performed in the autonomous driving mode situation in which the foldable accelerator pedal 60 is kept in the hide state. The situation in which the foldable accelerator pedal 60 is kept in the pop-up state is a situation in which the one-accelerator-pedal mode is performed in the manual driving mode situation in which the foldable accelerator pedal 60 is kept in the pop-up state.

Furthermore, the situation in which the foldable brake pedal 70 is switched to the hide state is a situation in which the one-accelerator-pedal mode is performed in the manual driving mode situation in which the foldable brake pedal 70 is kept in the pop-up state. The situation in which the foldable brake pedal 70 is kept in the hide state is a situation in which the one-accelerator-pedal mode is performed in the autonomous driving mode situation in which the foldable brake pedal 70 is kept in the hide state.

Next, when the one-brake-pedal mode switch 82 of the one-pedal mode switch 80 generates a signal, the foldable brake pedal 70 is switched to the pop-up state or kept in the pop-up state and the foldable accelerator pedal 60 is switched to the hide state or kept in the hide state under control of the autonomous driving controller 20 (state D in FIG. 1).

In the present case, the situation in which the foldable brake pedal 70 is switched to the pop-up state is a situation in which the one-brake-pedal mode is performed in the autonomous driving mode situation in which the foldable brake pedal 70 is kept in the hide state. The situation in which the foldable brake pedal 70 is kept in the pop-up state is a situation in which the one-brake-pedal mode is performed in the manual driving mode situation in which the foldable brake pedal 70 is kept in the pop-up state.

Furthermore, the situation in which the foldable accelerator pedal 60 is switched to the hide state is a situation in which the one-brake-pedal mode is performed in the manual driving mode situation in which the foldable accelerator pedal 60 is kept in the pop-up state. The situation in which the foldable accelerator pedal 60 is kept in the hide state is a situation in which the one-brake-pedal mode is performed in the autonomous driving mode situation in which the foldable accelerator pedal 60 is kept in the hide state.

When the driver manipulates the foldable accelerator pedal 60 in the manual driving mode situation in which both the foldable accelerator pedal 60 and the foldable brake pedal 70 pop up, the autonomous driving controller 20 transmits a control signal to a vehicle controller 90. The vehicle controller 90 transmits a control signal to a drive motor controller 110, and a drive motor 120 provided in the vehicle operates, such that the vehicle accelerates.

Furthermore, when the driver manipulates the foldable brake pedal 70 in the manual driving mode situation in which both the foldable accelerator pedal 60 and the foldable brake pedal 70 pop up, the autonomous driving controller 20 transmits a control signal to the vehicle controller 90. The vehicle controller 90 transmits a control signal to a braking controller 130, and a braking system 140 provided in the vehicle operates, such that the vehicle brakes.

Meanwhile, when the one-accelerator-pedal mode is performed as the driver manipulates the one-pedal mode switch 80, regenerative braking of the vehicle goes to a maximum level under control of the autonomous driving controller 20. In the present case, when the driver manipulates the popped-up foldable accelerator pedal 60, the autonomous driving controller 20 transmits a control signal to the vehicle controller 90. The vehicle controller 90 transmits a control signal to the drive motor controller 110, and the drive motor 120 provided in the vehicle operates, such that the vehicle accelerates.

When the one-accelerator-pedal mode is performed, the braking system 140 of the vehicle does not operate because of the control of the braking controller 130. Therefore, when the foldable accelerator pedal 60, which has been manipulated in the one-accelerator-pedal mode situation, returns, a braking force is generated by the regenerative braking, such that the vehicle decelerates or brakes.

Furthermore, when the one-brake-pedal mode is performed as the driver manipulates the one-pedal mode switch 80, the regenerative braking of the vehicle goes to the maximum level under control of the autonomous driving controller 20. In the present case, a control route is changed so that the control signal, which has been transmitted to the braking controller 130 from the vehicle controller 90, is transmitted to the drive motor controller 110.

Therefore, when the driver manipulates the popped-up foldable brake pedal 70, the autonomous driving controller 20 transmits a control signal to the vehicle controller 90. The vehicle controller 90 transmits a control signal to the drive motor controller 110, and the drive motor 120 provided in the vehicle, such that the vehicle accelerates.

When the one-brake-pedal mode is performed, the control signal is blocked so as not to be transmitted to the braking controller 130 as described above, such that the braking system 140 of the vehicle does not operate. Therefore, when the foldable brake pedal 70, which has been manipulated in the one-brake-pedal mode situation, returns, the braking force is generated by the regenerative braking, such that the vehicle decelerates or brakes.

Figure 3:
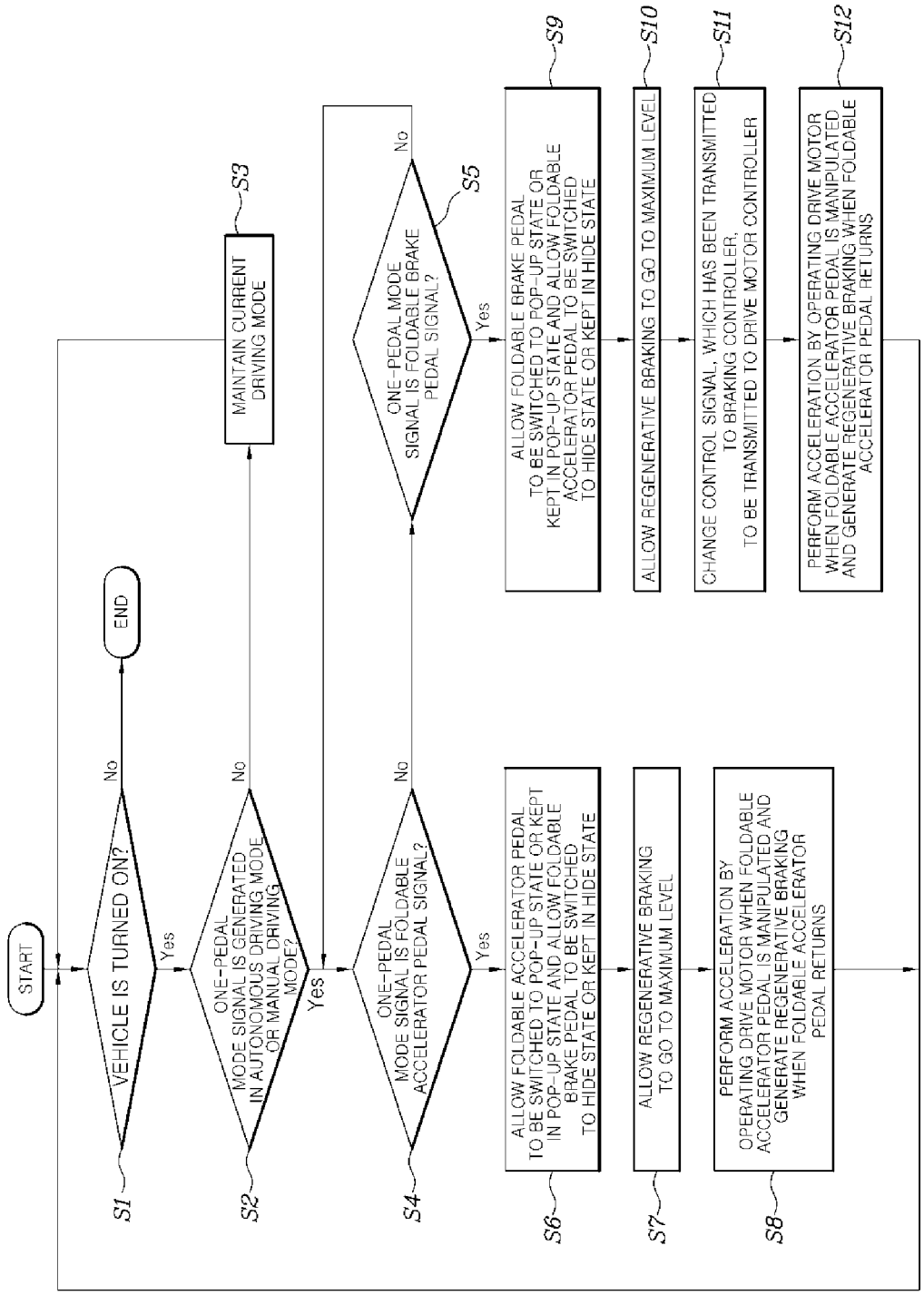

Hereinafter, a control process of various exemplary embodiments according to various exemplary embodiments of the present invention will be described with reference to FIG. 1, FIG. 2, and FIG. 3.

When the driver turns on the vehicle (step S1) in a state in which the autonomous vehicle having the foldable accelerator pedal 60 and the foldable brake pedal 70 is turned off, the vehicle is switched to the autonomous driving mode state or the manual driving mode state. In the present case, when the driver manipulates the one-pedal mode switch 80, the autonomous driving controller 20 determines whether the one-pedal mode signal is generated (step S2, signal generation determining step).

When the determination result in step S2 indicates that the one-pedal mode signal is not generated, the current driving state is continuously maintained, and the subsequent logic goes to the step before step S1 as feedback (step S3).

When the determination result in step S2 indicates that the one-pedal mode signal has been generated, whether the generated one-pedal mode signal is the foldable accelerator pedal signal (step S4) or the foldable brake pedal signal (step S5) is determined (signal type determining step).

First, when the determination result in step S4 indicates that the one-pedal mode signal is the foldable accelerator pedal signal, the foldable accelerator pedal 60 is switched to the pop-up state or kept in the pop-up state and the foldable brake pedal 70 is switched to the hide state or kept in the hide state under control of the autonomous driving controller 20 and the foldable pedal controller 30 (step S6, one-accelerator-pedal step).

When the one-accelerator-pedal step is performed, the regenerative braking of the vehicle goes to the maximum level (step S7). In the present case, when the driver manipulates the popped-up foldable accelerator pedal 60, an acceleration signal is generated under control of the autonomous driving controller 20, the vehicle controller 90, and the drive motor controller 110, such that the drive motor 120 operates, and the vehicle accelerates by the operation of the drive motor 120. Furthermore, when the manipulated foldable accelerator pedal 60 returns, the regenerative braking is performed, such that the vehicle decelerates or brakes (step S8).

Furthermore, when the determination result in step S5 indicates that the one-pedal mode signal is the foldable brake pedal signal, the foldable brake pedal 70 is switched to the pop-up state or kept in the pop-up state and the foldable accelerator pedal 60 is switched to the hide state or kept in the hide state under control of the autonomous driving controller 20 and the foldable pedal controller 30 (step S9, one-brake-pedal step).

When the one-brake-pedal step is performed, the regenerative braking of the vehicle goes to the maximum level (step S10). In the present case, the control route is changed so that the control signal, which has been transmitted to the braking controller 130 from the vehicle controller 90, is transmitted to the drive motor controller 110 (step S11).

Therefore, when the driver manipulates the popped-up foldable brake pedal 70, the acceleration signal is generated under control of the autonomous driving controller 20, the vehicle controller 90, and the drive motor controller 110, such that the drive motor 120 operates, and the vehicle accelerates by the operation of the drive motor 120. Furthermore, when the manipulated foldable accelerator pedal 60 returns, the regenerative braking is performed, such that the vehicle decelerates or brakes (step S12).

Figure 4:
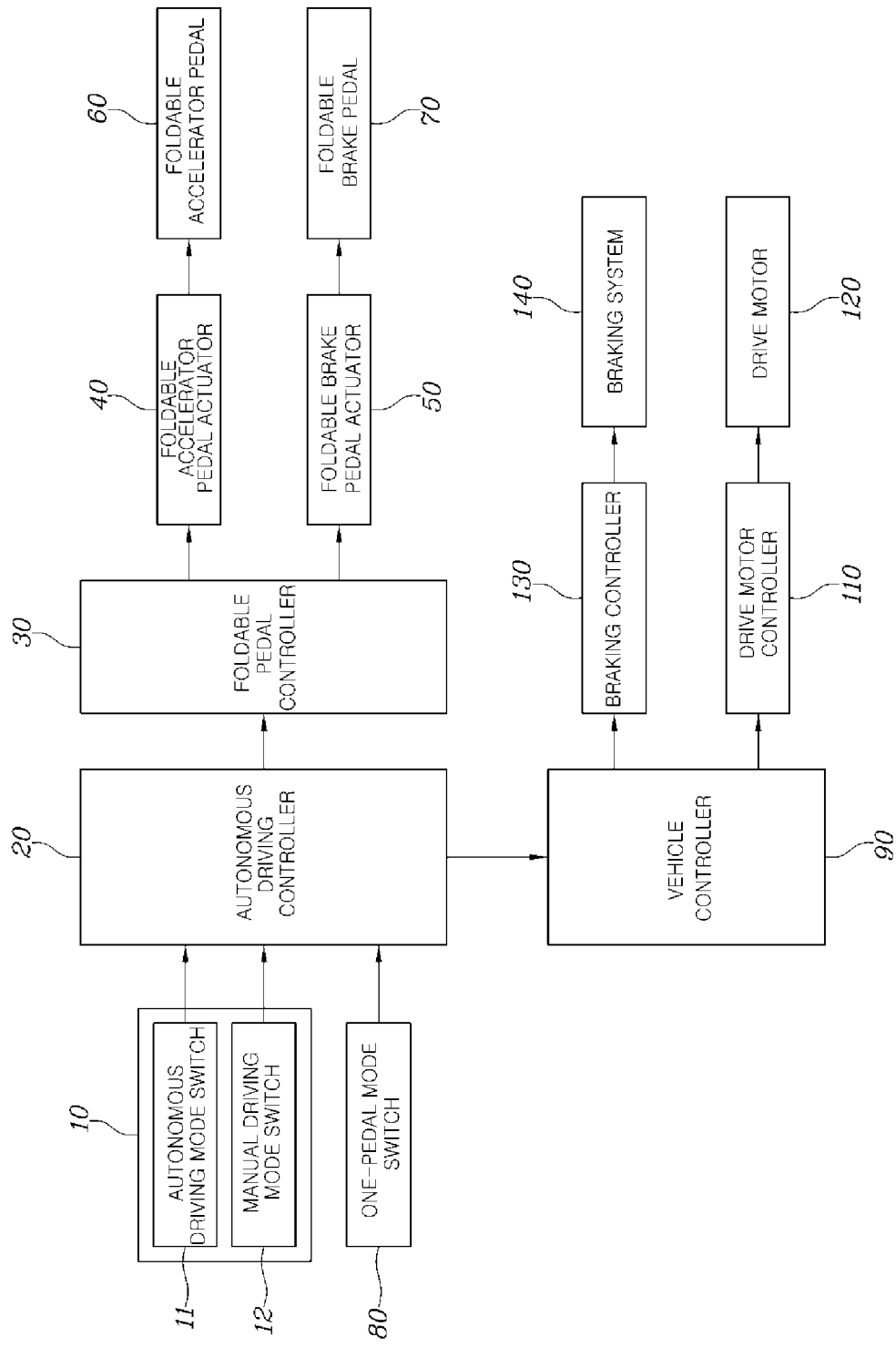
FIG. 4 and FIG. 5 are a block diagram and a flowchart for explaining a method of controlling an operation of a foldable pedal device according to various exemplary embodiments of the present invention.
Figure 5:
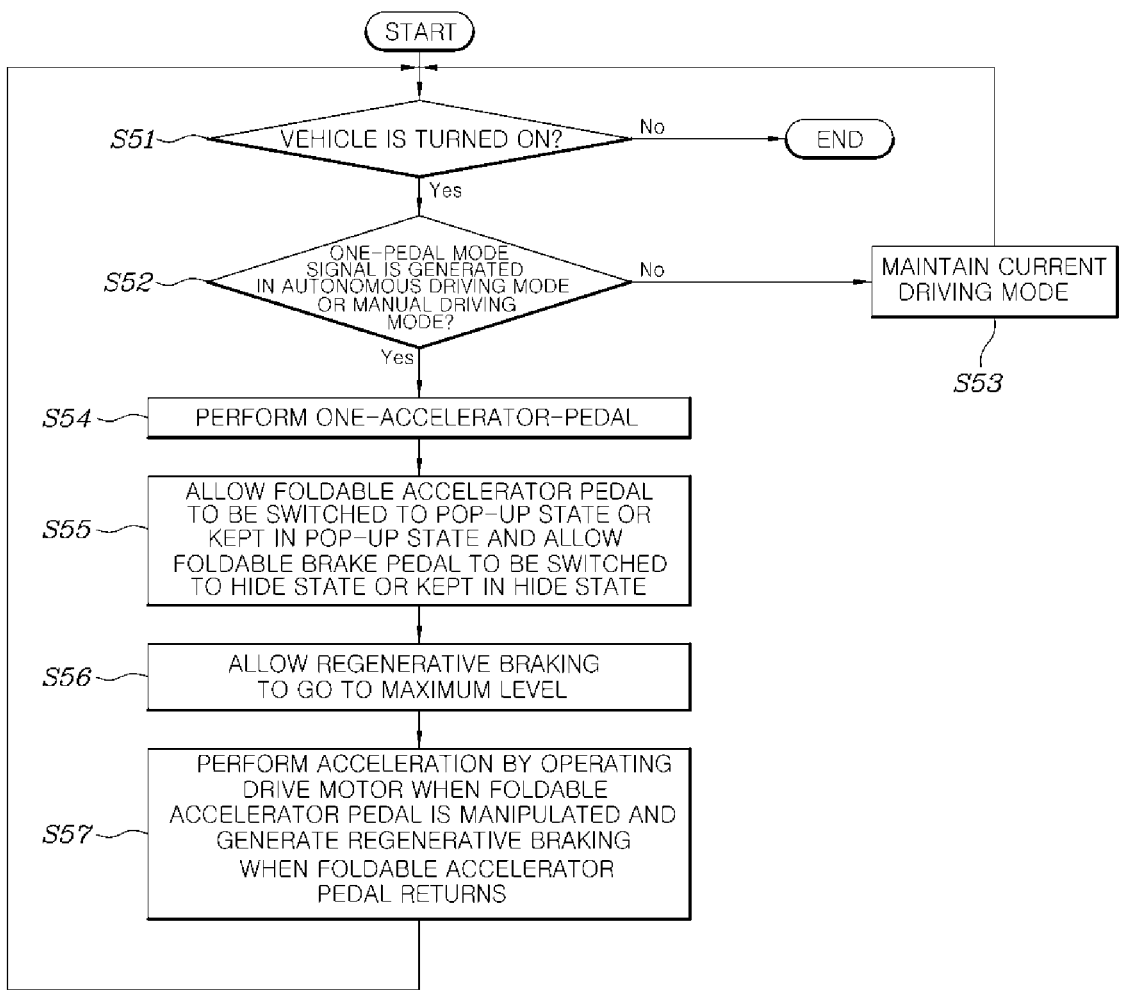

Next, a control process of various exemplary embodiments according to various exemplary embodiments of the present invention will be described with reference to FIGS. 4 to 5.

The control method of the various exemplary embodiments according to various exemplary embodiments of the present invention may include a signal generation determining step of determining whether the one-pedal mode signal has been generated in the autonomous driving mode situation or the manual driving mode situation; and a one-accelerator-pedal step of allowing the foldable accelerator pedal 60 to be switched to the pop-up state or kept in the pop-up state and allowing the foldable brake pedal 70 to be switched to the hide state or kept in the hide state when in the signal generation determining step, it is determined that the one-pedal mode signal has been generated.

That is, when the driver turns on the vehicle (step S51) in the state in which the autonomous vehicle having the foldable accelerator pedal 60 and the foldable brake pedal 70 is turned off, the vehicle is switched to the autonomous driving mode state or the manual driving mode state. In the present case, when the driver manipulates the one-pedal mode switch 80, the autonomous driving controller 20 determines whether the one-pedal mode signal is generated (step S52, signal generation determining step).

When the determination result in step S52 indicates that the one-pedal mode signal is not generated, the current driving state is continuously maintained, and the subsequent logic goes to the step before step S51 as feedback (step S53).

When the determination result in step S52 indicates that the one-pedal mode signal has been generated, the one-accelerator-pedal step is performed (step S54). When the one-accelerator-pedal step is performed, the foldable accelerator pedal 60 is switched to the pop-up state or kept in the pop-up state and the foldable brake pedal 70 is switched to the hide state or kept in the hide state under control of the autonomous driving controller 20 and the foldable pedal controller 30 (step S55).

When the one-accelerator-pedal step is performed, the regenerative braking of the vehicle goes to the maximum level (step S56). In the present case, when the driver manipulates the popped-up foldable accelerator pedal 60, an acceleration signal is generated under control of the autonomous driving controller 20, the vehicle controller 90, and the drive motor controller 110, such that the drive motor 120 operates, and the vehicle accelerates by the operation of the drive motor 120. Furthermore, when the manipulated foldable accelerator pedal 60 returns, the regenerative braking is performed, such that the vehicle decelerates or brakes (step S57).

As described above, in the exemplary embodiment of the present invention, both the foldable accelerator pedal 60 and the foldable brake pedal 70 are hidden in the autonomous driving mode, and both the foldable accelerator pedal 60 and the foldable brake pedal 70 basically pop up in the manual driving mode. Furthermore, the one-pedal mode may be implemented such that only one of the foldable accelerator pedal 60 and the foldable brake pedal 70 pops up in the manual driving mode according to the driver's selection. Therefore, it is possible to improve driver's convenience and marketability.

While the specific embodiments of the present invention have been illustrated and described, it will be obvious to those skilled in the art that the present invention may be variously modified and changed without departing from the technical spirit of the present invention defined in the appended claims.

In the exemplary embodiment of the present invention, the foldable accelerator pedal and the foldable brake pedal are hidden in the autonomous driving mode, and both the foldable accelerator pedal and the foldable brake pedal basically pop up in the manual driving mode. Furthermore, the one-pedal mode may be implemented such that only one of the foldable accelerator pedal and the foldable brake pedal pops up in the manual driving mode according to the driver's selection. Therefore, it is possible to improve driver's convenience and marketability.

The aforementioned invention can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by multiple control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling an operation of a foldable pedal device, the method comprising:
   a signal generation determining step of determining whether a one-pedal mode signal has been generated in an autonomous driving mode or a manual driving mode;
   a signal type determining step of determining whether the one-pedal mode signal is a foldable accelerator pedal signal or a foldable brake pedal signal when in the signal generation determining step, it is determined that the one-pedal mode signal has been generated; and a one-accelerator-pedal step of allowing a foldable accelerator pedal to be switched to a pop-up state or kept in the pop-up state and allowing a foldable brake pedal to be switched to a hide state or kept in the hide state when in the signal type determining step, it is determined that the one-pedal mode signal is the foldable accelerator pedal signal, wherein when a one-pedal mode switch connected to an autonomous driving controller is manipulated, the one-pedal mode signal is generated and transmitted to the autonomous driving controller, the autonomous driving controller is configured to transmit the one-pedal mode signal to a foldable pedal controller electrically connected to the autonomous driving controller, and the foldable accelerator pedal and the foldable brake pedal are controlled in operation by the foldable pedal controller to pop up or hide.

2. The method of claim 1, wherein the autonomous driving mode and the manual driving mode are performed under control of the autonomous driving controller that is connected to an autonomous driving mode switch and a manual driving mode switch and configured to receive a signal of the autonomous driving mode switch and a signal of the manual driving mode switch, wherein the autonomous driving controller is configured to transmit the signal of the autonomous driving mode switch and the signal of the manual driving mode switch to the foldable pedal controller electrically connected to the autonomous driving controller, and wherein the foldable accelerator pedal and the foldable brake pedal are controlled in operation by the foldable pedal controller to pop up or hide.

3. The method of claim 2, wherein when the signal of the autonomous driving mode switch is received, the foldable accelerator pedal and the foldable brake pedal are controlled in operation to be in the hide state.

4. The method of claim 2, wherein when the signal of the manual driving mode switch is received, the foldable accelerator pedal and the foldable brake pedal are controlled in operation to be in the pop-up state.

5. The method of claim 1, wherein the one-pedal mode switch includes a one-accelerator-pedal mode switch and a one-brake-pedal mode switch which are separated from each other and operate individually to generate signals thereof.

6. The method of claim 1, wherein the one-pedal mode switch is configured as a single switch, so that the one-pedal mode switch is manipulated once to generate one of the foldable accelerator pedal signal and the foldable brake pedal signal, and the one-pedal mode switch is manipulated twice continuously to generate another of the foldable accelerator pedal signal and the foldable brake pedal signal.

7. The method of claim 1, wherein regenerative braking of a vehicle goes to a maximum level when the one-accelerator-pedal step is performed, wherein when the foldable accelerator pedal in the pop-up state is manipulated, an acceleration signal is generated, so that the vehicle accelerates, and wherein the regenerative braking is generated when the foldable accelerator pedal is manipulated and returns to a predetermined position.

8. The method of claim 1, wherein when the foldable accelerator pedal signal determined in the signal type determining step is transmitted to the autonomous driving controller, the autonomous driving controller is configured to transmit a control signal of the autonomous driving controller to a vehicle controller electrically connected to the autonomous driving controller, the vehicle controller is configured to transmit a control signal of the vehicle controller to a drive motor controller electrically connected to the vehicle controller, and a drive motor electrically connected to the drive motor controller operates under control of the drive motor controller, so that a vehicle accelerates when the foldable accelerator pedal is manipulated.

9. The method of claim 1, further including:

a one-brake-pedal step of allowing the foldable brake pedal to be switched to the pop-up state or kept in the pop-up state and allowing the foldable accelerator pedal to be switched to the hide state or kept in the hide state when in the signal type determining step, it is determined that the one-pedal mode signal is the foldable brake pedal signal.

10. The method of claim 9, wherein when the one-brake-pedal step is performed, regenerative braking of a vehicle goes to a maximum level, wherein when the foldable brake pedal in the pop-up state is manipulated, an acceleration signal is generated, so that the vehicle accelerates, and wherein the regenerative braking is generated when the foldable brake pedal is manipulated and returns to a predetermined position.

11. The method of claim 9, wherein when the foldable brake pedal signal determined in the signal type determining step is transmitted to the autonomous driving controller, the autonomous driving controller is configured to transmit a control signal to a vehicle controller electrically connected to the autonomous driving controller, the control signal, which has been transmitted to a braking controller electrically connected to the vehicle controller, from the vehicle controller, is changed to be transmitted to a drive motor controller electrically connected to the vehicle controller, and a drive motor electrically connected to the drive motor controller operates under control of the drive motor controller, so that a vehicle accelerates when the foldable brake pedal is manipulated.

12. A method of controlling an operation of a foldable pedal device, the method comprising:

a signal generation determining step of determining whether a one-pedal mode signal has been generated in an autonomous driving mode or a manual driving mode; and a one-accelerator-pedal step of allowing a foldable accelerator pedal to be switched to a pop-up state or kept in the pop-up state and allowing a foldable brake pedal to be switched to a hide state or kept in the hide state when in the signal generation determining step, it is determined that the one-pedal mode signal has been generated, wherein an autonomous driving controller connected to a one-pedal mode switch is configured to transmit the one-pedal mode signal to a foldable pedal controller electrically connected to the autonomous driving controller, and the foldable accelerator pedal and the foldable brake pedal are controlled in operation by the foldable pedal controller to pop up or hide.

13. The method of claim 12, wherein the autonomous driving mode and the manual driving mode are performed under control of the autonomous driving controller that is connected to an autonomous driving mode switch and a manual driving mode switch and configured to receive a signal of the autonomous driving mode switch and a signal of the manual driving mode switch, wherein the autonomous driving controller is configured to transmit the signal of the autonomous driving mode switch and the signal of the manual driving mode switch to the foldable pedal controller electrically connected to the autonomous driving controller, and wherein the foldable accelerator pedal and the foldable brake pedal are controlled in operation by the foldable pedal controller to pop up or hide.

14. The method of claim 13, wherein when the signal of the autonomous driving mode switch is received, the foldable accelerator pedal and the foldable brake pedal are controlled in operation to be in the hide state.

15. The method of claim 13, wherein when the signal of the manual driving mode switch is received, the foldable accelerator pedal and the foldable brake pedal are controlled in operation to be in the pop-up state.

16. The method of claim 12, wherein when the one-pedal mode switch is manipulated, the one-pedal mode signal is generated and transmitted to the autonomous driving controller.

17. The method of claim 12, wherein regenerative braking of a vehicle goes to a maximum level when the one-accelerator-pedal step is performed, wherein when the foldable accelerator pedal in the pop-up state is manipulated, an acceleration signal is generated, so that the vehicle accelerates, and wherein the regenerative braking is generated when the foldable accelerator pedal is manipulated and returns to a predetermined position.

18. The method of claim 12, wherein when a signal of the one-pedal mode switch is transmitted to the autonomous driving controller, the autonomous driving controller is configured to transmit a control signal of the autonomous driving controller to a vehicle controller electrically connected to the autonomous driving controller, the vehicle controller is configured to transmit a control signal of the vehicle controller to a drive motor controller electrically connected to the vehicle controller, and a drive motor electrically connected to the drive motor controller operates under control of the drive motor controller, so that a vehicle accelerates when the foldable accelerator pedal is manipulated.

19. A foldable pedal device comprising:

a foldable accelerator pedal configured to be popped-up or hided when a foldable accelerator pedal actuator connected thereto operates;

a foldable brake pedal configured to be popped-up or hided when a foldable brake pedal actuator connected thereto operates;

a foldable pedal controller configured to control the foldable accelerator pedal actuator and the foldable brake pedal actuator; and a one-pedal mode switch configured to generate a one-pedal mode signal to be transmitted to the foldable pedal controller, wherein in response that the foldable accelerator pedal is operated, an acceleration signal is generated, so that a vehicle accelerates, and in response that the foldable accelerator pedal returns to a predetermined position, regenerative braking is generated;

wherein when it is determined that the one-pedal mode signal has been generated, the foldable accelerator pedal is switched to a pop-up state or kept in the pop-up state and the foldable brake pedal is switched to a hide state or kept in the hide state, by the foldable pedal controller.

20. The foldable pedal device of claim 19, wherein an autonomous driving controller connected to a one-pedal mode switch is configured to transmit the one pedal mode signal generated from the one pedal mode switch to the foldable pedal controller.

* * * * *